(12) United States Patent
Nagami

(10) Patent No.: US 8,413,303 B2
(45) Date of Patent: Apr. 9, 2013

(54) HINGE MECHANISM

(75) Inventor: Tetsuro Nagami, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/139,435

(22) PCT Filed: Oct. 20, 2009

(86) PCT No.: PCT/JP2009/005489
§ 371 (c)(1), (2), (4) Date: Jun. 13, 2011

(87) PCT Pub. No.: WO2010/092640
PCT Pub. Date: Aug. 19, 2010

(65) Prior Publication Data
US 2011/0239405 A1    Oct. 6, 2011

(30) Foreign Application Priority Data
Feb. 10, 2009    (JP) ................................. 2009-028480

(51) Int. Cl.
E05D 11/10    (2006.01)

(52) U.S. Cl.
USPC .................. 16/334; 16/380; 16/386; 403/242

(58) Field of Classification Search .................... 16/277, 16/297, 334, 335, 337, 342, 374, 380, 386; 248/922; 361/679.27, 679.21, 679.22; 403/103, 403/242, 248
See application file for complete search history.

(56) References Cited

U.S. PATENT DOCUMENTS

| 5,867,872 | A | * | 2/1999 | Katoh | 16/337 |
| 5,894,633 | A | * | 4/1999 | Kaneko | 16/306 |
| 5,913,351 | A | * | 6/1999 | Miura | 16/340 |
| 5,970,580 | A | * | 10/1999 | Katoh | 16/337 |
| 6,785,936 | B2 | * | 9/2004 | Koshikawa | 16/328 |
| 6,988,294 | B2 | * | 1/2006 | Birtley | 16/342 |
| 6,990,711 | B2 | * | 1/2006 | Koshikawa et al. | 16/334 |
| 7,143,476 | B2 | * | 12/2006 | Minami | 16/340 |
| 7,975,350 | B2 | * | 7/2011 | Nagami | 16/367 |
| 8,196,261 | B2 | * | 6/2012 | Hayahi | 16/337 |
| 2009/0217486 | A1 | * | 9/2009 | Itakura et al. | 16/334 |
| 2011/0075335 | A1 | * | 3/2011 | Nagami | 361/679.01 |
| 2011/0154616 | A1 | * | 6/2011 | Nagami | 16/333 |
| 2012/0036680 | A1 | * | 2/2012 | Nagami | 16/297 |

FOREIGN PATENT DOCUMENTS

| JP | 52-51059 | | 1/1977 |
| JP | 11-13723 | A | 1/1999 |
| JP | 11-169250 | A | 6/1999 |
| JP | 2001107941 | A * | 4/2001 |
| JP | 2001-207718 | A | 8/2001 |
| JP | 2006-105275 | A | 4/2006 |
| WO | WO 2008/146428 | A1 | 12/2008 |

* cited by examiner

Primary Examiner — William L. Miller
(74) Attorney, Agent, or Firm — Birch, Stewart, Kolasch & Birch, LLP

(57) ABSTRACT

A hinge mechanism includes: a bracket 2 having a rotation shaft portion insertion hole 2a for inserting through a marginal rotating shaft portion 3b thereof, and one engaging concavo-convex section 2b; a plate 5 having a mounting shaft portion insertion hole 5a; and a leaf spring 4 having a mounting shaft portion insertion hole 4a and the other engaging concavo-convex section 4c, and located between the bracket 2 and plate 5 and mounted to the rotation shaft 3, wherein the hole 5a is formed larger than the hole 4a such that the spring 4 is caulked and fixed to the end face of the shaft portion by entering of the outer wall side part of a mounting shaft portion 3c formed on the end face of the portion 3b that is collapsed by caulking into a gap 5c formed between the portion 3c and insertion hole 5a.

4 Claims, 6 Drawing Sheets (a)

(b)

(a)

(b)

HINGE MECHANISM

TECHNICAL FIELD

The present invention relates to a hinge mechanism having a click mechanism that holds a monitor at a plurality of angles when the monitor is foldably and unfoldably mounted to a ceiling face of a vehicle, for example.

BACKGROUND ART

As this type of hinge mechanism in the prior art, there is a tilt hinge device disclosed in Patent Document 1, for example. The tilt hinge device includes: a mounting member having a base portion and a bearing plate; a rotation shaft at the end thereof having a large diameter portion, a medium diameter portion, and a small diameter portion in this order, and having the medium diameter portion bearing-supported in a bearing hole provided through the bearing plate; a spring washer which is attached to the small diameter portion on the opposite side from the large diameter portion with pinching the bearing plate having the medium diameter portion inserted thereinto; and a pressing washer which is attached to the end of the small diameter portion, and is secured to the small diameter portion and compresses the spring washer, because of the entering of an inner wall-side thickness of the pressing washer into a peripheral groove formed at the outer periphery of the small diameter portion, to thereby clamp the bearing plate and the spring washer against the wall portion of the large diameter portion, wherein the rotation shaft rotates only when a predetermined rotating torque is exerted thereon.

PRIOR ART DOCUMENTS

Patent Documents

Patent Document 1: JP-A-2001-207718

SUMMARY OF THE INVENTION

In the hinge mechanism disclosed in Patent Document 1 described above, the pressing washer is compressed with a pressurizing punch, and the thickness collapsed by the pressurization swells to get into a peripheral groove formed around the small diameter portion. Thus, it is impossible to confirm the entering of the thickness by seeing it from outside, and there is no method of judging whether the portion of the pressing washer has positively entered the peripheral groove of the small diameter portion, in other words, whether the portion thereof has been surely crimped and fixed into the small diameter portion. Further, since the pressing washer is pressed axially of the rotation shaft with the pressurizing punch, buckling can occur in the medium diameter portion of the rotation shaft, thus making difficult the adjustment of force of pressurization. Also, a relationship between the spring washer and the rotation shaft is established to be rotated about a axis; thus, when the hinge mechanism makes a rotation movement in a state of a product, the spring washer sometimes rotates together with the rotation shaft, and sometimes does not rotate together with the shaft depending on the pressurizing condition of the punch, thus causing the rotation torque of the product to materially vary.

Furthermore, in a traditional hinge mechanism shown in FIG. 8, at the end of a rotation shaft 30 which is inserted through a circular portion insertion hole 20a provided through a bracket 20, there are provided: a flange 30a having a diameter larger than that of the circular portion insertion hole 20a; a circular portion 30b which has a diameter slightly smaller than that of the circular portion insertion hole 20a by the dimension of a fit, and has a length slightly larger than the thickness (t) of the bracket 20; and a non-circular portion 30c of substantially I shape that is formed at the end face of the circular portion 30b has a diameter smaller than that of the circular portion, and has a flat face formed on both sides thereof.

The non-circular portion 30c of the rotation shaft 30 that is inserted through the circular portion insertion hole 20a of the bracket 20 is inserted through a circular portion insertion hole 40a of a leaf spring 40 and a circular portion insertion hole 50a of a plate 50 as shown in FIG. 8(a), and then, is axially crimped as shown in FIG. 8(b); however, the circular portion insertion hole 40a of the leaf spring 40 and the circular portion insertion hole 50a of the plate 50 each have an area slightly larger than the sectional area of the non-circular portion 30c of the rotation shaft 30 by the dimension of a fit. Therefore, even when the plate 50 is clamped against the rotation shaft 30 by crimping, there is a dimensional difference between the leaf spring 40 and the non-circular portion 30c of the rotation shaft 30 by the dimension of a fit; thus, there is a problem such that the dimensional difference creates a backlash in an operating section (not shown) of a product using the hinge mechanism, and causes abnormal noise to be generated when the force of the leaf spring is released in rotating operation.

The present invention has been made to solve the above-mentioned problems, and an object of the present invention is to provide a hinge mechanism such that when a leaf spring is directly crimped and fixed to a rotation shaft, backlash between the leaf spring and the mounting shaft portion of the rotation shaft is eliminated, to thus suppress abnormal noise that can be generated when the spring force of the leaf spring is released in rotating operation.

The hinge mechanism according to the present invention includes: a bracket having a rotation shaft portion insertion hole to be inserted through by a rotation shaft portion of a rotation shaft provided to an openable and closable body and having one engaging concavo-convex section on a circumference centered on the rotation shaft portion insertion hole; a plate having a mounting shaft portion insertion hole for inserting through a mounting shaft portion formed on the end face of the rotation shaft portion; and a leaf spring having a mounting shaft portion insertion hole for inserting through the mounting shaft portion, and also the other engaging concavo-convex section for engaging the one engaging concavo-convex section of the bracket to hold the openable and closable body at a predetermined rotation angle position, the leaf spring being located between the bracket and the plate, and mounted to the rotation shaft, wherein the mounting shaft portion insertion hole of the plate is formed larger than the mounting shaft portion insertion hole of the leaf spring such that the leaf spring is crimped and fixed to the end face of the rotation shaft portion by the entering of the outer wall side part of the mounting shaft portion that is collapsed by crimping into a gap formed between the mounting shaft portion and the mounting shaft portion insertion hole of the plate.

According to the present invention, the mounting shaft portion insertion hole of the plate is formed larger than the mounting shaft portion insertion hole of the leaf spring, and thus the outer wall side part of the mounting shaft portion that is collapsed by crimping enters the gap formed between the mounting shaft portion insertion hole of the plate and the mounting shaft portion of the rotation shaft to crimp and fix the leaf spring to the end face of the rotation shaft portion. As a result, there is obtained an advantageous effect that the wobble between the leaf spring and the rotation shaft can be eliminated, and abnormal noise can be restrained from being generated when the spring force of the leaf spring is released in rotating operation.

BRIEF DESCRIPTION OF THE DRAWINGS

FIG. 3 (a) is an end view of the rotation shaft; FIG. 3 (b) is a front view of a leaf spring; FIG. 3 (c) is a front view of a plate; and FIG. 3 (d) is an end view of the rotation shaft to which the leaf spring and the plate are assembled in this order.

FIG. 4 (a) is a sectional view before crimping; and FIG. 4(b) is a sectional view after crimping.

FIG. 7(a) is a sectional view before crimping; and FIG. 7(b) is a sectional view after crimping.

FIG. 8(a) is a sectional view before crimping; and FIG. 8(b) is a sectional view after crimping.

BEST MODE FOR CARRYING OUT THE INVENTION

Embodiments of the present invention will now be described with reference to the accompanying drawings in order to explain the present invention in more detail.

First Embodiment

Figure 1:
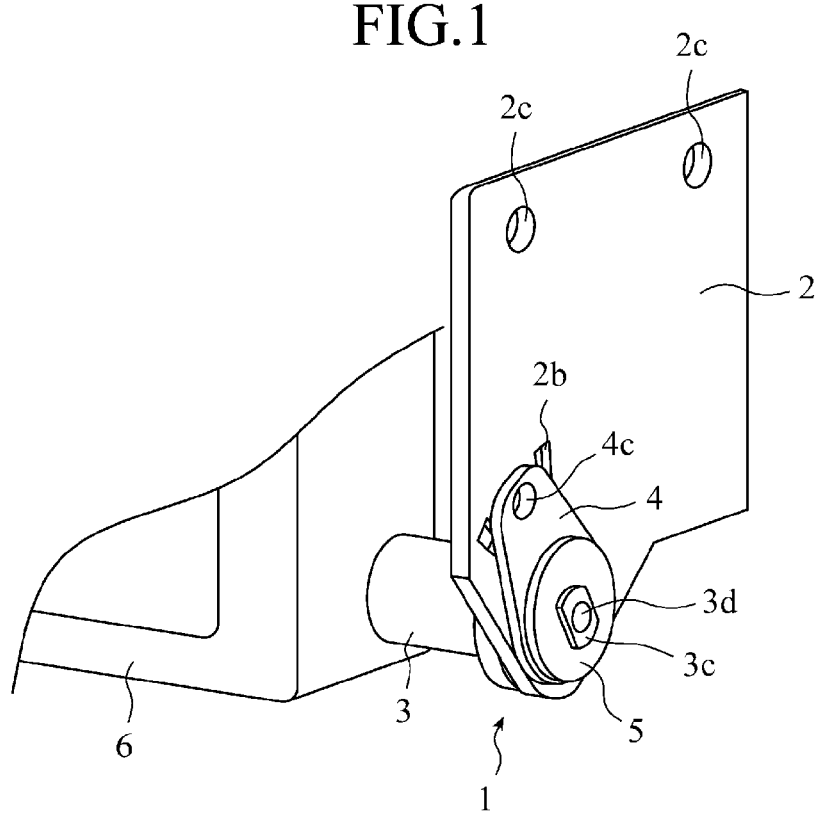
FIG. 1 is a perspective view showing a first embodiment of a hinge mechanism according to the present invention.

The present invention will be explained by using as an example a case where a monitor as an openable and closable body is foldably and unfoldably mounted on a housing case (not shown) installed on a ceiling face of a vehicle. As shown in FIG. 1, a hinge mechanism 1 has a structure where a circular portion 3b working as a rotation shaft portion of a rotation shaft 3, which is caused to laterally project from the side of a monitor (openable and closably body) 6, is passed through a circular portion insertion hole (rotation shaft portion insertion hole) 2a of a bracket 2, a leaf spring 4 and a plate 5 are assembled to a non-circular portion 3c serving as a mounting shaft portion provided at the end of the circular portion 3b inserted through the circular portion insertion hole 2a, and the non-circular portion 3c is crimped to rotatably fix the rotation shaft 3 to the bracket 2.

Figure 2:
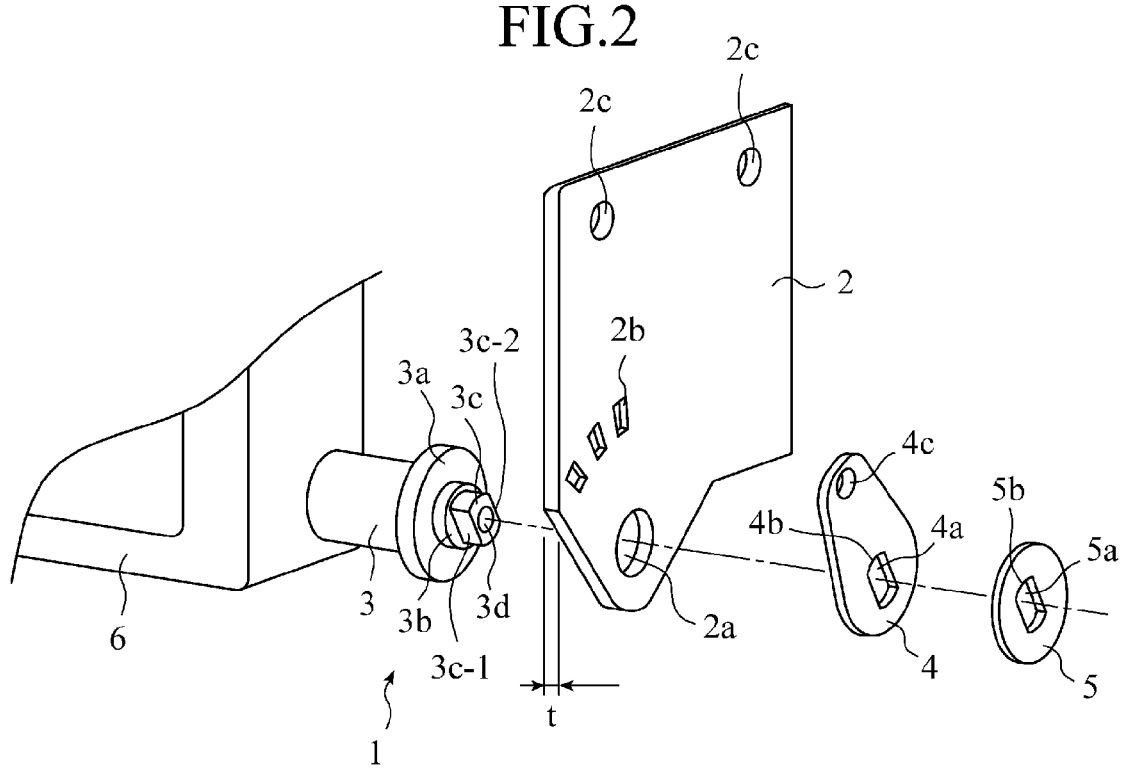
FIG. 2 is an exploded perspective view of the hinge mechanism in FIG. 1.
Figure 3:
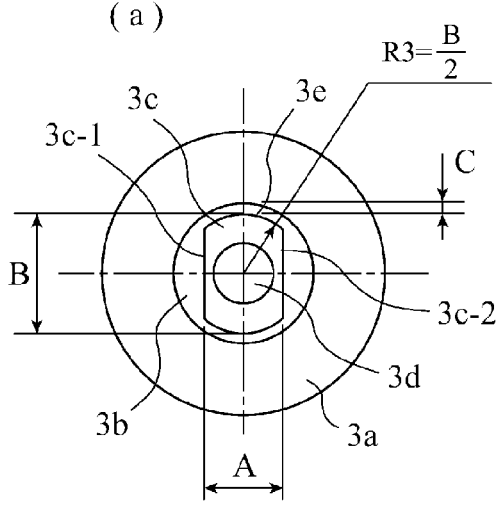
FIG. 3 is a figure of a rotation shaft constituting the hinge mechanism in FIG. 1 and other constituent components assembled to the rotation shaft, as is viewed in the direction where the components are assembled to the rotation shaft.
Figure 3:
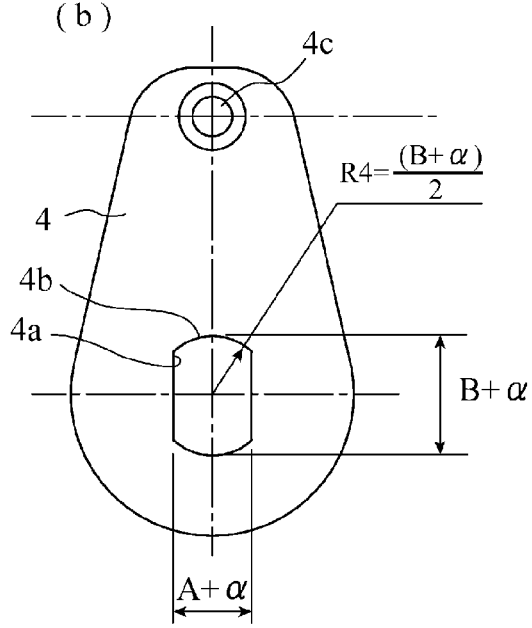
Figure 3:
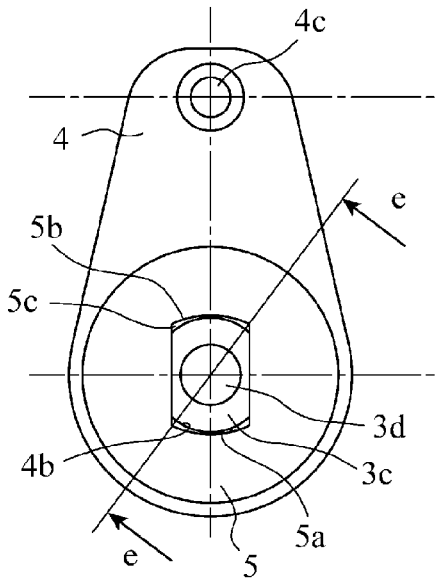
Figure 3:
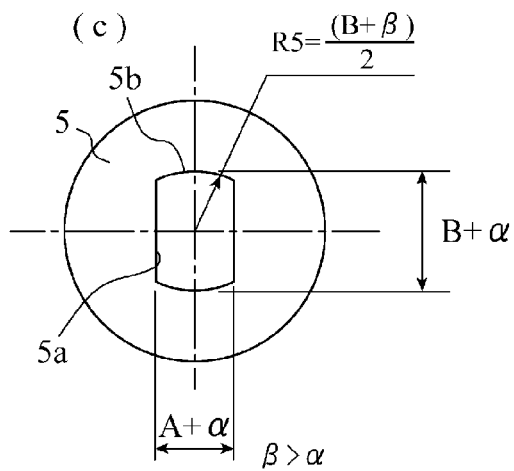

The constituent members will now be explained in more detail with reference to FIG. 2 and FIG. 3. In the bracket 2, the circular portion insertion hole 2a to be inserted thereinto by an end portion of the rotation shaft 3, and a plurality of engaging concavities (one engaging concavo-convex section) 2b centered at the circular portion insertion hole 2a are provided at the lower end side thereof, while screw holes 2c for mounting screws are provided at the upper end side thereof. The bracket 2 is mounted in the housing case (not shown) installed on the ceiling face of the vehicle with the mounting screws passed through the screw holes 2c.

In the rotation shaft 3, a flange 3a having a diameter larger than that of the circular portion insertion hole 2a formed through the bracket 2; the circular portion 3b having a diameter slightly smaller by the dimension of a fit than that of the circular portion insertion hole 2a, and having a length slightly larger than the thickness (t) of the bracket 2; and the non-circular portion 3c having a diameter smaller than that of the circular portion (diameter difference C) and further having both sides cut in generally "I" shape so as to have planes 3c-1, 3c-2 are formed. (Note that the circular portion 3b and the non-circular portion 3c may have the same diameter, and further the diameter difference C may be zero.)

In the leaf spring 4, a non-circular portion insertion hole (mounting shaft portion insertion hole) 4a having an area slightly larger by the dimension of a fit than that of the non-circular portion 3c of the rotation shaft 3 and having a shape substantially same as the sectional shape of the non-circular portion is provided at the lower end side thereof, while an engaging protrusion (the other engaging concavo-convex section) 4c that fits in one of the engaging concavities 2b of the bracket 2 and is used for holding the rotation angle of the hinge mechanism 1 at a predetermined angle is provided at the upper end side thereof. The shape of the non-circular portion insertion hole 4a will be discussed in more detail with reference to FIG. 3(a) and FIG. 3(b). The width $(A+\alpha)$ and the height $(B+\alpha)$ of the non-circular portion insertion hole 4a are arranged to be slightly larger by the dimension of a fit $(\alpha)$ than the width (A) and the height (B) of the non-circular portion 3c of the rotation shaft 3, respectively.

In the plate 5, a non-circular portion insertion hole (mounting shaft portion insertion hole) 5a having an area slightly larger by the dimension of a fit than that of the non-circular portion 3c of the rotation shaft 3 and having a shape substantially same as the sectional shape of the non-circular portion is provided at the center thereof. The shape of the non-circular portion insertion hole 5a will be discussed in more detail using FIG. 3 (a) and FIG. 3 (c). The width $(A+\alpha)$ and the height $(B+\alpha)$ of the non-circular portion insertion hole 5a are arranged to be slightly larger by the dimension of a fit (a) than the width (A) and the height (B) of the non-circular portion 3c of the rotation shaft 3, respectively.

Here, the radius R3 of the circular arc part 3e in the non-circular portion 3c of the rotation shaft 3 is B/2, whereas the radius R4 of the circular arc part 4b in the non-circular portion insertion hole 4a of the leaf spring 4 is $(B+\alpha)/2$. Further, the radius R5 of the circular arc part 5b in the non-circular portion insertion hole 5a of the plate 5 is $(B+\beta)/2$. Here, the widths $(A+\alpha)$ and the heights $(B+\alpha)$ of the non-circular portion insertion hole 4a and the non-circular portion insertion hole 5a are the same to each other; however, the circular arc part 4b and the circular arc part 5b are formed in a relationship of $\beta>\alpha$, and thus the non-circular portion insertion hole 5a is larger than the non-circular portion insertion hole 4a, thus forming a gap 5c between the circular arc part 3e of the non-circular portion 3c and the circular arc part 5b of the non-circular portion insertion hole 5a of the plate 5.

Figure 4:
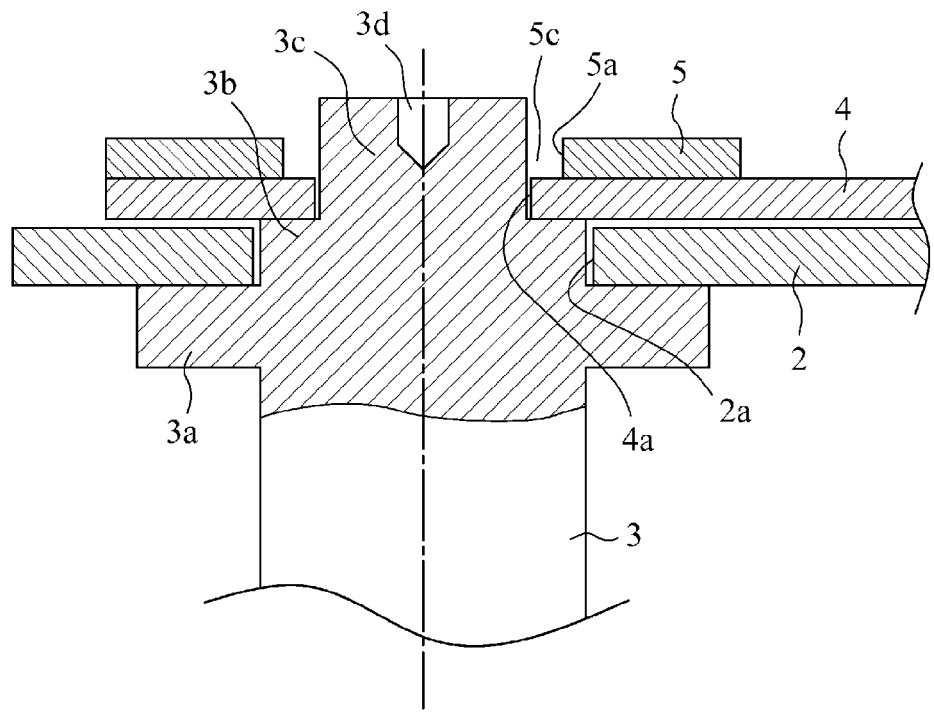
FIG. 4 is a sectional view showing the end of the rotation shaft to which the leaf spring and the plate are assembled in this order in the hinge mechanism of the first embodiment, along the line e-e of FIG. 3(d)
Figure 4:
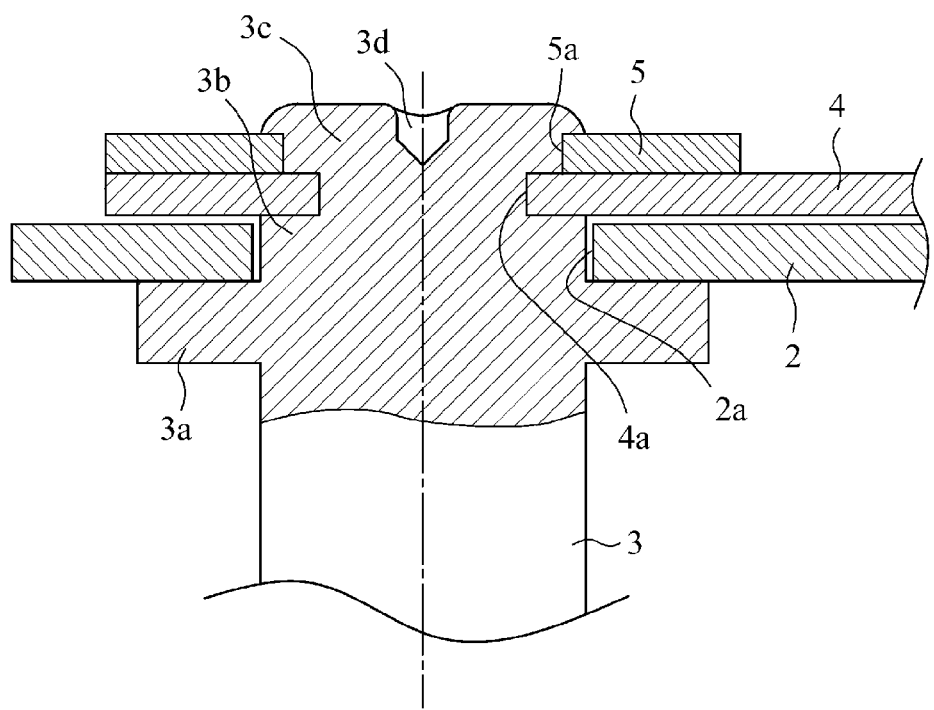

In the following, the order in which the rotation shaft 3 is rotatably assembled to the bracket 2 will be described. The end portion of the rotation shaft 3 formed integral with the monitor 6 is inserted into the circular portion insertion hole 2a of the bracket 2 until the flange 3a having a large diameter abuts against the bracket 2. In such an insertion state, the circular portion 3b of the rotation shaft 3 that is slightly longer than the thickness (t) of the bracket 2 is located within the circular portion insertion hole 2a of the bracket 2, and the leaf spring 4 and the plate 5 are assembled to the non-circular portion 3c of the rotation shaft 3 that is inserted through the circular portion insertion hole 2a by the non-circular portion insertion hole 4a and the non-circular portion insertion hole 5a, respectively. This state is illustrated in FIG. 4 (a). FIG. 4 is a sectional view taken along the line e-e of FIG. 3 (d).

Under such a condition, when the end portion of the rotation shaft 3, that is, the non-circular portion 3c thereof, is crimped with a crimping machine (not shown) in a direction axially of the rotation shaft 3, of the outer wall side part of the non-circular portion 3c, which is deformed by being collapsed by crimping as shown in FIG. 4(b), the outer wall side part having been expanded over the face of the plate 5 presses the plate 5 against the leaf spring 4, and also the outer wall side part of the non-circular portion 3c, which fits into a gap 5c formed between the circular arc part 3e and the circular arc part 5b of the non-circular portion insertion hole 5a, forces down the leaf spring 4 against the end face of the circular portion 3b to positively crimp and fix the leaf spring to the rotation shaft 3.

As discussed above, in accordance with the first embodiment, the non-circular portion insertion hole 5a of the plate 5 is formed having a diameter larger than that of the non-circular portion insertion hole 4a provided through the leaf spring 4. Therefore, the outer wall side part of the non-circular portion 3c, which is deformed by being collapsed by crimping, fits into the gap 5c between the non-circular portion insertion hole 5a of the plate 5 and the non-circular portion 3c of the rotation shaft 3 to force down the leaf spring 4, and thus it is possible to positively crimp and fix the leaf spring 4 to the rotation shaft 3. As a consequence, there is obtained an effect that chattering between the leaf spring and the rotation shaft can be eliminated, and abnormal noise can be restrained from being generated when the spring force of the leaf spring is released in rotating operation.

Further, when a concavity 3d for promoting crimping is previously formed in the center of the end of the non-circular portion 3c of the rotation shaft 3, the volume having to be collapsed by crimping can be reduced, thus enabling the force of pressurization necessary for crimping to be reduced. Moreover, the circular arc part 3e of the non-circular portion 3c has therearound the outer wall side part which is collapsed and expanded in crimping. Thus, there can be expected a crimping effect which is similar to that obtained in the case where the non-circular portion 3c of the rotation shaft 3 does not have provided the concavity 3d for promoting crimping in the center of the end face thereof, and also it becomes possible to use a crimping machine having a lowered ability, that is, a lowered pressurization force for that.

Second Embodiment

Figure 5:
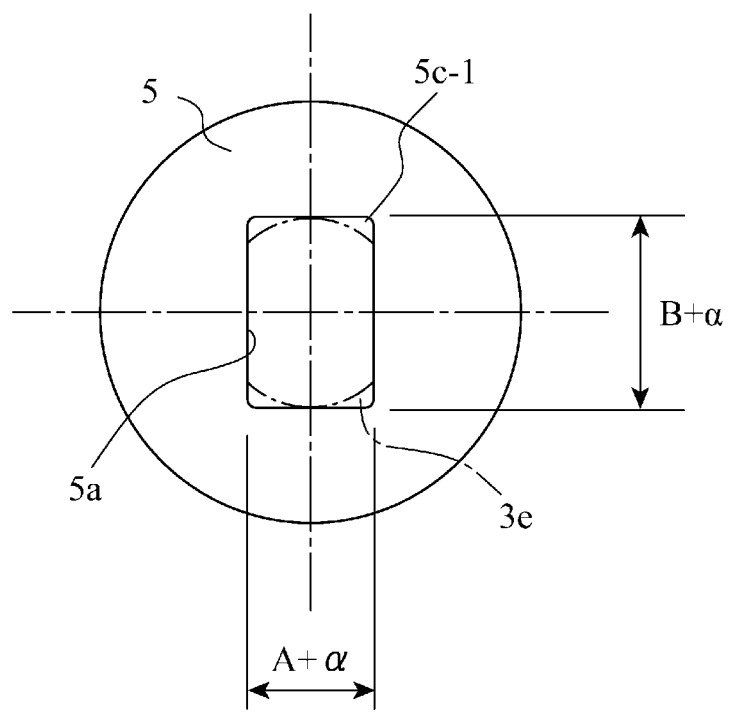
FIG. 5 is a front view showing a plate used in a second embodiment of a hinge mechanism according to the present invention.
Figure 6:
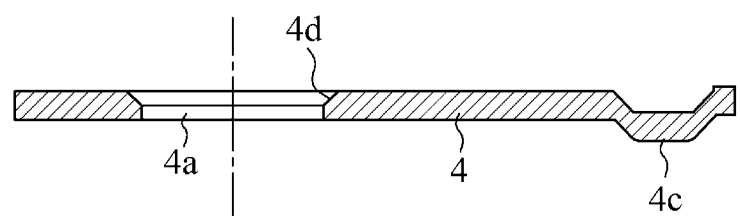
FIG. 6 is a sectional view showing a leaf spring used in a third embodiment of a hinge mechanism according to the present invention.

A hinge mechanism in accordance with the second embodiment has a structure where the non-circular portion insertion hole 5a of the plate 5 is formed having a generally rectangular shape having a width (A+α) and a height (B+α), and having a small circular arc only at each of four corners as shown in FIG. 5. Therefore, the four corners each have formed therein a gap 5c-1 which is larger than the gap formed in the case shown in FIG. 3(d), and the deformed outer wall side part of the non-circular portion 3c of the rotation shaft 3, which has been collapsed by crimping, fits into the gaps in high amounts, thus enabling a larger crimping effect to be obtained. Moreover, forming the non-circular portion insertion hole 5a thereof so as to have a generally rectangular shape enables a die for forming the non-circular portion insertion hole to be easily built and maintained.

Third Embodiment

Figure 7:
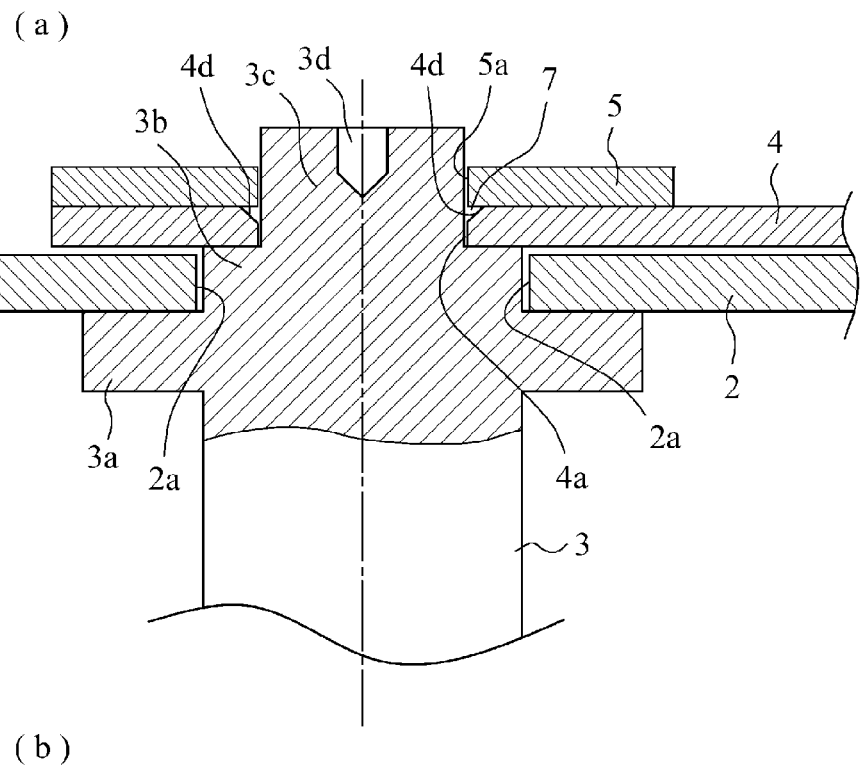
FIG. 7 is a sectional view showing the end of a rotation shaft to which a leaf spring and a plate are assembled in this order in a hinge mechanism of the third embodiment.
Figure 7:
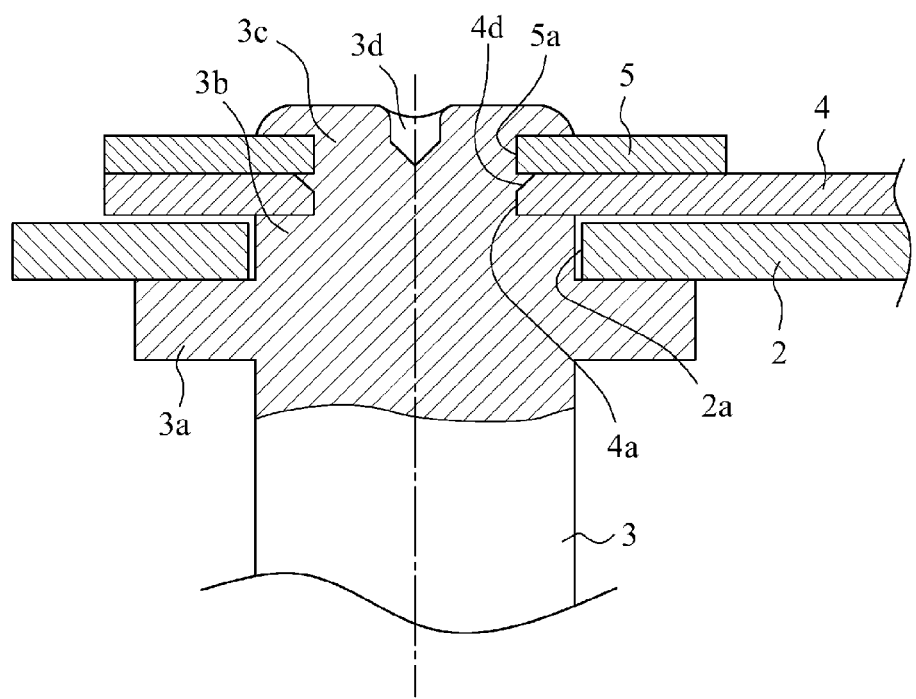
Figure 8:
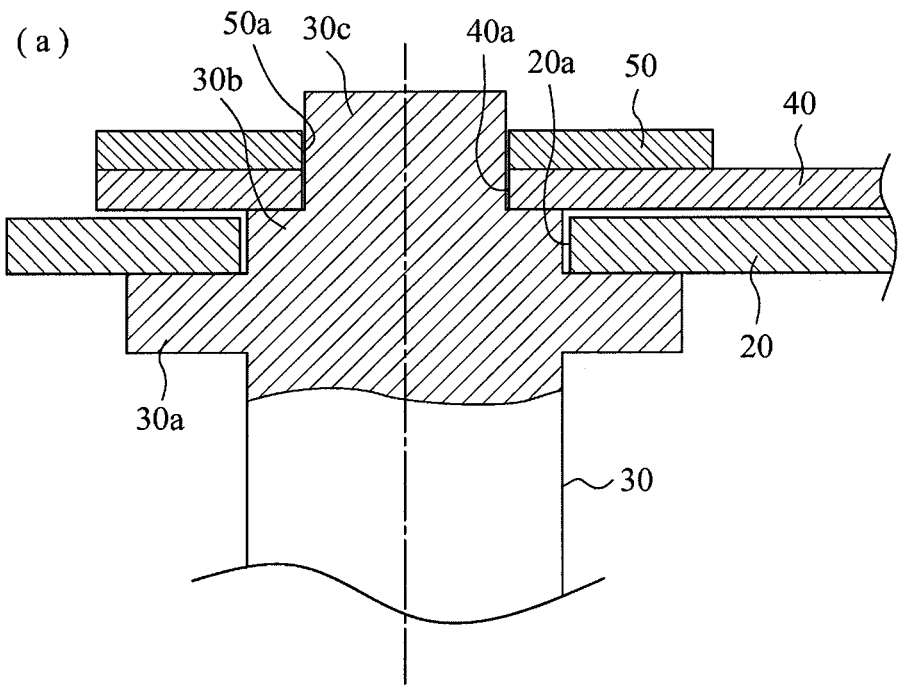
FIG. 8 is a sectional view showing the end of a rotation shaft to which a spring and a plate are assembled in this order in a conventional hinge mechanism.
Figure 8:
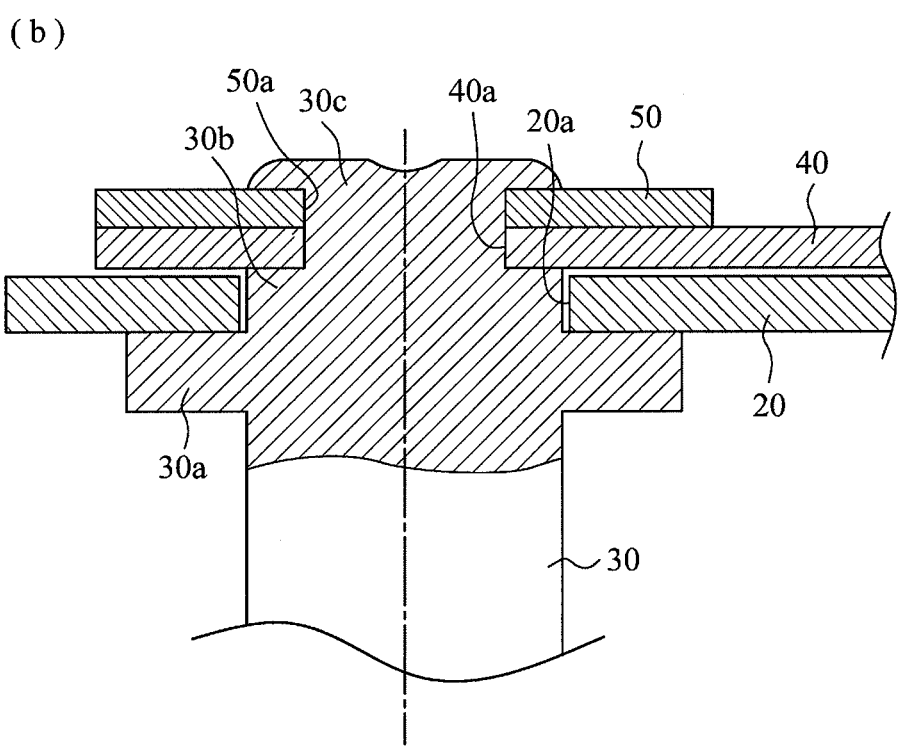

A hinge mechanism in accordance with the third embodiment has a structure where a sloping face 4d expanded or flared outwardly toward the plate 5 is formed such that a gap 7 is formed between the wall face of the non-circular portion insertion hole of the leaf spring 4 and the plate 5 as shown in FIG. 7. In the case, it is arranged that the non-circular portion insertion hole 4a of the leaf spring 4 and the non-circular portion insertion hole 5a of the plate 5 have the same diameter and shape of hole to each other, and that the non-circular portion insertion hole 4a and the non-circular portion insertion hole 5a have a shape which is slightly larger by the dimension of a fit than that of the non-circular portion 3c of the rotation shaft 3.

With this arrangement, when the non-circular portion 3c of the rotation shaft 3 is inserted through the non-circular portion insertion hole 4a of the leaf spring 4 and the non-circular portion insertion hole 5a of the plate 5 (FIG. 7 (a)) and the non-circular portion 3c is crimped in a direction axially of the rotation shaft 3, the deformed outer wall side part of the non-circular portion 3c collapsed by crimping fits into a gap 7 formed by the sloping face 4d of the leaf spring 4 as shown in FIG. 7(b). Therefore, of the outer wall side part of the non-circular portion 3c collapsed by crimping, the outer wall side part thereof expanded over the face of the plate 5 presses the plate against the leaf spring 4, and also the outer wall side part of the non-circular portion 3c having fitted into the gap 7 presses the leaf spring 4 against the end face of the circular portion 3b of the rotation shaft 3. As a result, there is obtained an effect that the leaf spring 4 can be more positively crimped and fixed to the rotation shaft 3, and abnormal noise can be restrained from being generated when the spring force of the leaf spring is released in rotating operation.

Hereupon, in each of the embodiments discussed above, the non-circular portion 3c of the rotation shaft 3 is formed having a rectangular transverse cross-sectional configuration, and the non-circular portion insertion hole 4a of the leaf spring 4 and the non-circular portion insertion hole 5a of the plate 5, both of which are inserted through by the non-circular portion 3c, are formed each having a rectangular shape similar to each other. That is because the leaf spring 4 and the plate 5 are arranged to be able to rotate integrally with the rotation shaft 3 which rotates. Therefore, it may be arranged that the non-circular portion 3c of the rotation shaft 3 be formed having an elliptic transverse cross-sectional configuration, and the non-circular portion insertion hole 4a of the leaf spring 4 and the non-circular portion insertion hole 5a of the plate 5 be formed each having an elliptic shape similar to the configuration. In short, the leaf spring 4 and the plate 5 only have to have a shape by which those components can be rotated integrally with the rotation shaft 3.

INDUSTRIAL APPLICABILITY

The hinge mechanism according to the present invention can counteract chattering between the leaf spring and the rotation shaft, and can restrain abnormal noise from being generated when the spring force of the leaf spring is released in rotating operation. Thus, the hinge mechanism is suitable for use in a hinge mechanism or the like, which has a click mechanism for foldably and unfoldably mounting a monitor on a ceiling face of a vehicle and holding the monitor thereon at a plurality of angles.

The invention claimed is:

1. A hinge mechanism comprising:
    a rotation shaft provided to an openable and closable body;
    a bracket having a rotation shaft portion insertion hole receiving a rotation shaft portion of the rotation shaft and having at least one concave engaging section on a circumference centered on the rotation shaft portion insertion hole;
    a plate having a mounting shaft portion insertion hole receiving a mounting shaft portion formed on an end face of the rotation shaft portion; and
    a leaf spring having a mounting shaft portion insertion hole receiving the mounting shaft portion and also having a convex engaging section for engaging the at least one concave engaging section of the bracket to hold the openable and closable body at a predetermined rotation angle position, the leaf spring being located between the bracket and the plate,
    wherein the mounting shaft portion insertion hole of the plate is formed larger than the mounting shaft portion insertion hole of the leaf spring, such that the leaf spring is crimped and fixed to the end face of the rotation shaft portion by an outer wall side part of the mounting shaft portion that is collapsed, due to an end face of the mounting shaft portion being crimped, into a gap formed between the mounting shaft portion and the mounting shaft portion insertion hole of the plate.

2. A hinge mechanism comprising:
    a rotation shaft provided to an openable and closable body;
    a bracket having a rotation shaft portion insertion hole receiving a rotation shaft portion of the rotation shaft and having at least one concave engaging section on a circumference centered on the rotation shaft portion insertion hole;
    a plate having a mounting shaft portion insertion hole receiving a mounting shaft portion formed on an end face of the rotation shaft portion; and
    a leaf spring having a mounting shaft portion insertion hole receiving the mounting shaft portion and also having a convex engaging section for engaging the at least one concave engaging section of the bracket to hold the openable and closable body at a predetermined rotation angle position, the leaf spring being located between the bracket and the plate,
    wherein a wall face of the mounting shaft portion insertion hole of the leaf spring is arranged to have a sloping face expanded outwardly toward the plate such that a gap is formed between the wall face and the plate.

3. The hinge mechanism according to claim 1, the mounting shaft portion has a concavity for promoting collapse of the outer wall side part of the mounting shaft portion when crimped formed in a center of the end face thereof.

4. The hinge mechanism according to claim 2, the mounting shaft portion has a concavity for promoting collapse of the outer wall side part of the mounting shaft portion when crimped formed in a center of an end face thereof.

* * * * *